(12) United States Patent
Isomäki et al.

(10) Patent No.: US 10,097,696 B2
(45) Date of Patent: Oct. 9, 2018

(54) METHOD AND APPARATUS FOR DIRECT CONTROL OF SMART DEVICES WITH A REMOTE RESOURCE

(71) Applicant: Nokia Technologies Oy, Espoo (FI)

(72) Inventors: Markus Isomäki, Espoo (FI); Teemu Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/108,568

(22) PCT Filed: Jan. 15, 2014

(86) PCT No.: PCT/IB2014/058291
§ 371 (c)(1),
(2) Date: Jun. 27, 2016

(87) PCT Pub. No.: WO2015/107388
PCT Pub. Date: Jul. 23, 2015

(65) Prior Publication Data
US 2016/0323457 A1 Nov. 3, 2016

(51) Int. Cl.
*H04M 11/00* (2006.01)
*H04W 88/04* (2009.01)
(Continued)

(52) U.S. Cl.
CPC ......... *H04M 11/007* (2013.01); *H04L 67/303* (2013.01); *H04W 4/70* (2018.02); *H04W 4/80* (2018.02); *H04W 88/04* (2013.01)

(58) Field of Classification Search
CPC .................................................... H04M 11/007
See application file for complete search history.

(56) References Cited

U.S. PATENT DOCUMENTS 8,639,391 B1 * 1/2014 Alberth, Jr. ............ G05B 15/02
340/657
2007/0156876 A1 * 7/2007 Sundarrajan ............ H04L 67/28
709/223
(Continued)

FOREIGN PATENT DOCUMENTS

EP 2683146 1/2014
WO WO 2013038230 3/2013
(Continued)

OTHER PUBLICATIONS

International Search Report and Written Opinion received for corresponding Patent Cooperation Treaty Application No. PCT/IB2014/058291, dated Nov. 7, 2014, 19 pages.
(Continued)

*Primary Examiner* — Michael T Vu
(74) *Attorney, Agent, or Firm* — Alston & Bird LLP (57) ABSTRACT

A method, apparatus and computer program product are provided for direct control of constrained electronic devices with a remote resource. A method performed in a mobile device is provided. The method includes the mobile device receiving a network address and a smart device identifier from a smart device; accessing a remote resource, such as an external internet application, based on the network address; receiving a command indication, wherein the command indication indicates an action to be executed by the smart device; and causing a transmission of a command to the smart device, wherein the transmission includes the smart device identifier.

12 Claims, 6 Drawing Sheets

(51) Int. Cl.
  *H04L 29/08* (2006.01)
  *H04W 4/70* (2018.01)
  *H04W 4/80* (2018.01)

(56) References Cited

U.S. PATENT DOCUMENTS

| | | | |
|---|---|---|---|
| 2008/0120439 A1 | 5/2008 | Kwan et al. | |
| 2011/0126010 A1 | 5/2011 | Kim et al. | |
| 2012/0079582 A1 | 3/2012 | Brown et al. | |
| 2012/0280801 A1* | 11/2012 | Muratsu | G08C 17/00 340/12.5 |
| 2013/0080898 A1 | 3/2013 | Lavian et al. | |
| 2013/0090773 A1* | 4/2013 | Park | H04L 12/12 700/286 |
| 2013/0097274 A1 | 4/2013 | Moss | |
| 2013/0238744 A1* | 9/2013 | Paschke | G06F 9/543 709/216 |
| 2013/0241743 A1 | 9/2013 | Loic | |
| 2014/0304381 A1 | 10/2014 | Savolainen et al. | |

FOREIGN PATENT DOCUMENTS

| | | |
|---|---|---|
| WO | WO 2013/057493 | 4/2013 |
| WO | WO 2013063381 | 5/2013 |
| WO | WO 2013/119730 | 8/2013 |
| WO | WO 2014/188049 | 11/2014 |
| WO | WO 2015/088481 | 6/2015 |

OTHER PUBLICATIONS

Gyu Myoung Lee et al; "The Internet of Things—Concept and Problem Statement", draft-lee-iot-problem-statement-05.K Internet Engineering Task Force, IETF; StandardWorkingDraft, Internet Society (ISOC)4, rue des Falaises CH-1205 Geneva, Switzerland; publishing date:Jul. 30, 2012.

*About HTML5 WebSocket—Powered by Kaazing* [online] [retrieved Jun. 21, 2017]. Retrieved from the Internet: <URL: http://www.websocket.org/aboutwebsocket.html>. 4 pages.

*Cross-origin resource sharing—Wikipedia* [online][retrieved Jun. 21, 2017]. Retrieved from the Internet: <URL: https://en.wikipedia.org/wiki/Cross-origin_resource_sharing>. (Jun. 14, 2017) 6 pages.

Dodson, B, et al., *Micro-Interactions with NFC-Enabled Mobile Phones*,[online] [retrieved Jun. 21, 2017]. Retrieved from the Internet: <http://mobisocial.stanford.edu/papers/mobicase11.psf>, (Oct. 18, 2013) 20 pages.

Extended European Search Report for corresponding European Application No. 14878737.7 dated Jun. 6, 2017, 13 pages.

Savolainen, T. et al., *CoAP over WebSockets draft-savolainen-core-coap-websockets-01*, [online][retrieved Jun. 21, 2017]. Retrieved from the Internet: <https://tools.ietf.org/html/draft-savolainen-core-coap-websockets-01>. (Oct. 18, 2013) 18 pages.

Shelby, Z. et al., *Constrained Application: Protocol (CoAp) draft-ietf-core-coap-18*, [online][retrieved Jun. 21, 2017]. Retrieved from the Internet: <https://tools.ietf.org/html/draft-ietf-core-coap-18>. (Jun. 28, 2013) 118 pages.

*System Applications Working Group Charter* [online] [retrieved Jun. 21, 2017]. Retrieved from the Internet: <URL: http://www.w3.org/2012/09/sysapps-wg-charter.html>. (2012) 10 pages.

Office Action for European Application No. 1487837.7 dated Mar. 21, 2018, 8 pages.

* cited by examiner

METHOD AND APPARATUS FOR DIRECT CONTROL OF SMART DEVICES WITH A REMOTE RESOURCE

RELATED APPLICATION

This application was originally filed as PCT Application No. PCT/IB2014/058291 filed Jan. 15, 2014.

TECHNOLOGICAL FILED

An example embodiment of the present invention relates generally to control of constrained electronic devices and, more particularly, to direct control of smart devices with a remote resource.

BACKGROUND

Some electronic devices utilize an internet based interface for initial setup and interaction. Typically the device itself may run an internal internet server, or an external internet server is communicating with the device. For example, a home router with an internet based configuration interface may be such an electronic device.

For most devices currently available supporting an internet server with hypertext transfer protocol (HTTP) or hypertext markup language (HTML) forms is not a large burden. As more devices are developed to interact with each other and the internet in the "Internet of Things" there may be many devices for which supporting an internet server is a large burden or not possible due to configuration. These electronic devices designed to interact with other devices and the internet with limited processing and/or communication may be referred to as "smart devices."

Smart devices, such as sensors, tags, actuators, or the like may support only short range radio technology, such as near field communication (NFC), Bluetooth Low Energy (BLE), or the like. Further, smart devices may only offer a simple application protocol interface and processing ability.

BRIEF SUMMARY

A method, apparatus and computer program product are provided in accordance with an example embodiment in order to facilitate the direct control of smart devices with a remote resource. Some example smart devices may include digital thermostat, clocks, radios, digital displays, kitchen appliances, or the like. Interaction with a smart device using an internet browser or internet based application may be quite valuable in digital displays, sensors, actuators, and the like and may range from simple to robust controls and displays. For example, a hotel room thermostat with an internet based user interface may be such a smart device. The basic user interface of a thermostat may include the current temperature, temperature setting, and a warmer or colder action buttons. A more robust user interface of a thermostat may include the temperature outside, the forecast, general advertisements, or advertisements specific to the user.

The interactions with smart devices may be one-time only or ad hoc, therefore setup overhead for the communicating mobile device may be minimized. As such, the smart device may be able to communicate using short range radio communication a network address, such as a universal resource locator (URL), and/or a smart device identifier to a mobile device. The mobile device may access a remote resource using the network address and in some instances the smart device identifier. The mobile device may use the remote resource to transmit a command to the smart device.

In an example embodiment a method is provided including receiving a network address and an identifier from a smart device; accessing a remote resource based on the network address; receiving a command indication, which indicates an action to be executed by the smart device; and causing a transmission of a command to the smart device. The command includes the smart device identifier.

The method of an example embodiment may also include causing the transmission of the identifier; and accessing a remote resource is also based on the smart device identifier. The method of an example embodiment may also include causing the transmission of the command indication to the remote resource; and receiving a command from the remote resource. In the method of this embodiment, at least one of the transmitting the command indication or the receiving the command is encrypted. The method of an example embodiment may also include causing the smart device to execute the command. The method of an example embodiment may also include receiving a command reply from the smart device in response to the smart device receiving the command. The method of an example embodiment may also include causing the transmission of the command replay to the remote resource; receiving a smart device action indication; and causing the smart device action indication to be displayed on a user interface.

In another example embodiment, an apparatus is provided that includes at least one processor and at least one memory including computer program code with the memory and computer program code configured to, with the processor, cause the apparatus to receive a network address and an identifier from a smart device; access a remote resource based on the network address; receive a command indication, wherein the command indication indicates an action to be executed by the smart device; and cause a transmission of a command to the smart device. The command includes the smart device identifier.

The at least one memory and computer program code may be further configured to, with the processor, cause the apparatus of an example embodiment to cause the transmission of the command indication to the remote resource; and receive a command from the remote resource. In this embodiment of the apparatus at least one of the transmission of the command indication or the receiving the command are encrypted. The at least one memory and computer program code may be further configured to, with the processor, cause the apparatus of an example embodiment to receive a command reply from the smart device in response to the smart device receiving the command.

The at least one memory and computer program code may be further configured to, with the processor, cause the apparatus of an example embodiment to cause the smart device to execute the command. The at least one memory and computer program code may be configured to, with the processor, cause the apparatus to cause the transmission of the command replay to the remote resource; receive a smart device action indication; and cause the smart device action indication to be displayed on a user interface.

In a further embodiment, a computer program product is provided that includes at least one non-transitory computer readable medium having program code portions stored thereon with the program code portions configured, upon execution, to receive a network address and an identifier from a smart device; access a remote resource based on the network address; receive a command indication, wherein the command indication indicates an action to be executed by the smart device; and cause a transmission of a command to the smart device. The command includes the smart device identifier.

The computer-executable program code portions of an example embodiment may also include program instructions to cause the transmission of the identifier. In this regard, the accessing a remote resource is also based on the smart device identifier. The computer-executable program code portions of an example embodiment may also include program instructions to cause the transmission of the command indication to the remote resource and receive a command from the remote resource. In this regard at least one of the transmitting the command indication or the receiving the command are encrypted. The computer-executable program code portions of an example embodiment may also include program instructions to cause the smart device to execute the command.

The computer-executable program code portions of an example embodiment may also include program instructions to receive a command reply from the smart device in response to the smart device receiving the command. The computer-executable program code portions of an example embodiment may also include program instructions to cause the transmission of the command replay to the remote resource; receive a smart device action indication; and cause the smart device action indication to be displayed on a user interface.

In yet another example embodiment, an apparatus is provided that includes means for receiving a uniform resource locator and an identifier from a smart device; means for accessing a remote resource based on the uniform resource locator; means for receiving, from a user interface, a command indication, wherein the command indication indicates an action to be executed by the smart device; and means for causing a transmission of a command to the smart device. The transmission of the command includes the smart device identifier.

BRIEF DESCRIPTION OF THE SEVERAL VIEWS OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

An Example of Smart Device Communication

Figure 1:
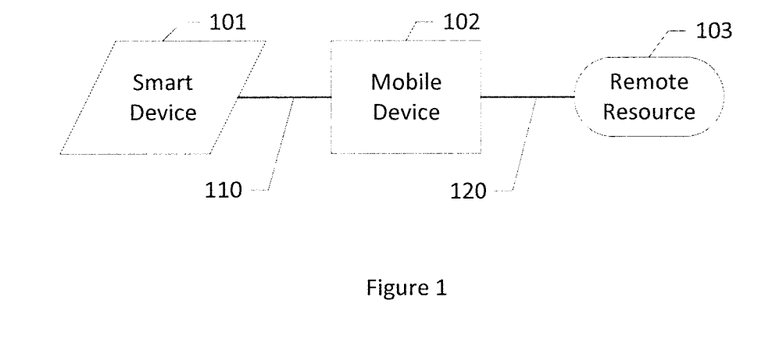
FIG. 1 illustrates a schematic representation of a communication between a smart device, a mobile device and a remote resource in accordance with an example embodiment of the present invention.

A method, apparatus and computer program product are provided in accordance with an example embodiment for direct control of smart devices with a remote resource. FIG. 1 illustrates a schematic representation of a communication between a smart device, a mobile device and a remote resource. The smart device 101 may establish a short range local connection 110 with a mobile device 102. The mobile device may, in turn, establish a network connection 120, such as an internet connection with a remote resource 103. A mobile device may include, without limitation, a cellular phone, smart phone, tablet computer, laptop computer, personal data assistant (PDA), television, or the like. Smart devices may be electronic devices designed to interact with other devices and the internet with limited processing and/or communication abilities. A smart device may include, without limitation, sensors, tags, actuators, displays, or the like. Some examples of smart devices may include thermostats, radios, clocks, kitchen appliances, digital displays, or the like. Other examples of smart devices may include devices that are traditionally not electronically controlled such as office chairs, doors, or the like which have been electronically automated with smart device actuators, sensors, or the like.

The short range local connection 110 between the smart device 101 and the mobile device may be NFC, BLE, RFID, Bluetooth, 802.15.4, Zigbee, Z-Wave, WiFi, or the like. In an instance in which the mobile device 102 comes within range of the smart device 101, the smart device 101 may transmit a network address, such as a URL, and a smart device identifier to the mobile device. The smart device identifier may be an internet protocol (IP) or specific radio technology address, such as a Bluetooth address, a software object, or the like. The smart device identifier may be transmitted separately from the network address or as a portion of the network address, such as the query element. The transmission of the smart device identifier as a portion of the network address may be useful in an instance in which the mobile device internet browser does not specifically recognize the smart device identifier. For example, the smart device 101 may transmit a network address or URL over NFC and a smart device identifier when a mobile device in within range.

In an example embodiment, a quick response (QR) code may be placed proximate to, such as by being carried by, the smart device 101. The mobile device 102 may be used to scan the QR code which may provide the network address and/or the smart device identifier.

In an example embodiment, the short range local connection 110 between the smart device 101 and the mobile device 102 may be a wired connection, communication modem and/or other hardware and/or software for supporting communication via cable, digital subscriber line (DSL), universal serial bus (USB) or other mechanisms. For example, the mobile device 102 may be a television or computer connected to a home network, and the smart device 101 may be lighting control.

Figure 5:
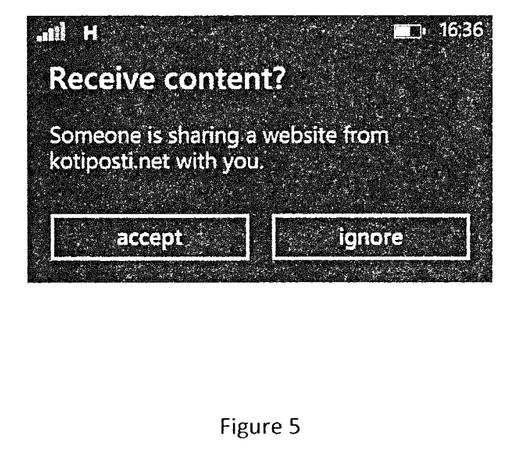
FIG. 5 illustrates an example content sharing prompt in accordance with an example embodiment of the present invention.

The mobile device 102 may be configured to automatically cause a browser to be executed in order to access the network address when received. In this regard, the mobile device may include or otherwise be associated with the browser, such as embodied by computer program instructions that may be configured to retrieve, present and traverse information resources on a network, such as the Internet. In an example embodiment the mobile device 102 may notify the user of the received network address, and require a manual initiation to access the network address. For example, the network address may be displayed as a link or content sharing prompt on a user interface, which the user may select to initiate the browser and access the network address, or reject. An example, content sharing prompt generated by a mobile device 102 receiving a network address from the smart device 101 is depicted in FIG. 5.

The mobile device 102 may access a remote resource 103 using the browser and network address. The remote resource may be an external internet page, an internet application, or the like that may be run or rendered on the mobile device 102. The mobile device 102 may access the remote resource 103 and display the remote resource information in a browser on a user interface. In an instance in which the network address does not contain the smart device identifier, the mobile device 102 may provide the smart device identifier to the remote resource 103. The remote resource 103 may provide a smart device communication identifier. The smart device communication identifier may be, for example, an object identifier in a JavaScript runtime environment or a specific application program interface (API) to fetch a software object that points to the smart device 101 that triggered the remote resource access. The smart device communication identifier may be added to the network address, such as the query element, or the like.

For example, the browser may access the URL pointing to a web application and containing a query element with the smart device identifier of the smart device. The browser may execute the Javascript code contained on the accessed internet page. The JavaScript code may direct the creation of a WebSocket connection with the smart device using the smart device identifier. In an instance in which a WebSocket is used to communicate with the smart device 101 no special permissions may be needed. In an instance in which specific radio technology, such as BLE, is used to communicate with the smart device 101, the remote resource or browser may need access to BLE APIs.

The mobile device 102 may receive a command indication from the user interface. The mobile device 102 may then generate a command which includes the smart device communication identifier. The command may direct various functions including, for example, to increase temperature, change advertisement display, display forecast, display outside temperature, start brewing coffee, or the like. Communications between the mobile device 102 and the smart device 101 may be means supported by both the mobile device and smart device, such as HTTP, WebSockets, constrained application protocol (CoAP), radio technology specific communications like BLE, NFC, RFID, or the like.

In an example embodiment, the communication with a smart device 101 may include a higher level of control by the remote resource 103. Specifically, the remote resource may have more control as to the how the smart device 101 is used and/or communicated with by validating commands and/or replies prior to transmission to the smart device or mobile device respectively. The mobile device 102 may receive the command indication from the user interface. The mobile device 102 may cause the transmission of the command indication to the remote resource 103. The remote resource may validate the command indication and generate a command. The remote resource 103 may transmit the command to the mobile device. In some embodiments, the transmission of the command indication from the mobile device 102 and/or the command transmitted by the remote resource 103 may be encrypted. Example commands may include a new temperature setting, a forecast or outside temperature for display on the smart device, a new display or advertisement for display on the smart device user interface, brew coffee at a specified time, dim lights, adjust chair height, or the like.

In an example embodiment, the remote resource 103 may restrict the communication with smart devices other than the smart device specified by the smart device identifier, unless the user explicitly grants additional permissions. The mobile device 102 may not require additional permissions to determine that the communication with the smart device identified by the smart device identifier is safe. In an instance in which HTTP and WebSockets are used to communicate with the smart device 101, cross-origin scripting may be used, e.g. the smart device includes Allow-Origins, external internet page header in the HTTP responses. In an instance in which a CoAP is used to communicate with the smart device 101, the protocol may be extended with headers similar to HTTP communications. In an instance in which radio technology specific communications are used to communicate with the smart device 101, the mobile device browser may record the current smart device identifier and network address or remote resource host name pairs and allow communication only with a smart device with a matching pair.

The mobile device 102 may cause the transmission of a command to the smart device 101, which includes the smart device communication identifier through the short range local connection 110. The command may be received by the smart device 101 which may, in turn, execute the command. In an example embodiment, the smart device 101 may be configured to additionally or alternatively verify the origin of the JavaScript even with the correct smart device communication identifier. For example, if the command is addressed with the correct smart device identifier, but the incorrect JavaScript origin the smart device 101 may reject the command.

In an example embodiment, the smart device may execute the command, and generate a reply. The smart device 101 may transmit the reply. The reply may include an acknowledgement of the command, a status of execution of the command, the smart device identifier, or the like. In an example embodiment, the reply transmitted from the smart device 101 may be encrypted. In an example embodiment, the mobile device 102 may generate a smart device action indication, in response to the reply from the smart device 101.

In an example embodiment in which the remote resource exercises greater control, the mobile device 102 may receive the reply from the smart device 101. The mobile device 102 may cause the transmission of the reply to the remote resource 103. The remote resource 103 may receive the reply and verify the validity of the reply, such as the validity of a smart device identifier and/or action indicated in the reply, or the like. The remote resource 103 may generate a smart device action indication. The remote resource 103 may transmit the smart device action indication to the mobile device 102.

The mobile device 102 may receive the smart device action indication from the remote resource 103. The mobile device 102 may cause the smart device action indication to be displayed on a user interface. The displayed smart device action indication may include the command, smart device identifier, command completion status, or the like.

An Example Apparatus

Figure 2:
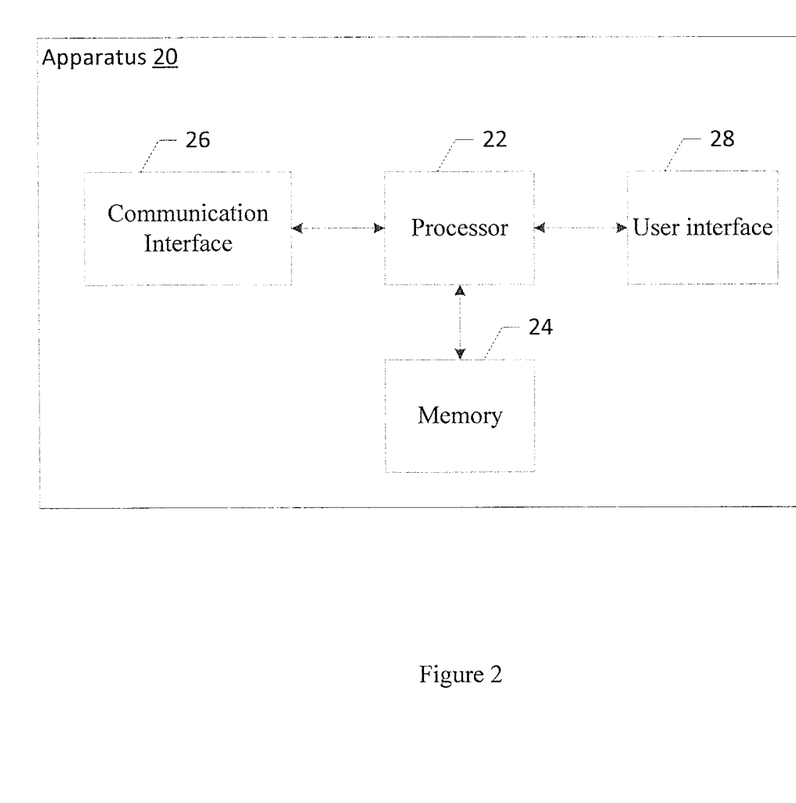
FIG. 2 is a block diagram of an apparatus that may be specifically configured for directly controlling smart devices with a remote resource in accordance with an example embodiment of the present invention.

The mobile device 102, such as cellular phone, smart phone, tablet computer, laptop computer, personal data assistant (PDA), or the like, may include or otherwise be associated with an apparatus 20 as shown in FIG. 2. The apparatus, such as that shown in FIG. 2, is specifically configured in accordance with an example embodiment of the present invention to provide for direct control of a smart device with a remote resource. The apparatus 20 may include or otherwise be in communication with a processor 22, a memory device 24, a communication interface 26 and a user interface 28. In some embodiments, the processor 22 (and/or co-processors or any other processing circuitry assisting or otherwise associated with the processor) may be in communication with the memory device 24 via a bus for passing information among components of the apparatus. The memory device 24 may be non-transitory and may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus 20 to carry out various functions in accordance with an example embodiment of the present invention. For example, the memory device 24 could be configured to buffer input data for processing by the processor 22. Additionally or alternatively, the memory device 24 could be configured to store instructions for execution by the processor 22.

As noted above, the apparatus 20 may be embodied by a mobile device 102. However, in some embodiments, the apparatus 20 may be embodied as a chip or chip set. In other words, the apparatus 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 20 may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 22 may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor 22 may be configured to execute hard coded functionality. As such, whether configured by hardware or software methods, or by a combination thereof, the processor 22 may represent an entity (e.g., physically embodied in circuitry) capable of performing operations according to an embodiment of the present invention while configured accordingly. Thus, for example, when the processor 22 is embodied as an ASIC, FPGA or the like, the processor may be specifically configured hardware for conducting the operations described herein. Alternatively, as another example, when the processor 22 is embodied as an executor of software instructions, the instructions may specifically configure the processor to perform the algorithms and/or operations described herein when the instructions are executed. However, in some cases, the processor 22 may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more smart device 101, remote resource 103, or the like. In this regard, the communication interface 26 may include, for example, an antenna (or multiple antennas) and supporting hardware and/or software for enabling communications with a wireless communication network. Additionally or alternatively, the communication interface 26 may include the circuitry for interacting with the antenna(s) to cause transmission of signals via the antenna(s) or to handle receipt of signals received via the antenna(s). In some environments, the communication interface 26 may alternatively or also support wired communication. As such, for example, the communication interface 26 may include a communication modem and/or other hardware and/or software for supporting communication via cable, digital subscriber line (DSL), universal serial bus (USB) or other mechanisms.

The apparatus 20 may also optionally include a user interface 28 that may, in turn, be in communication with the processor 22 to provide output to the user and, in some embodiments, to receive an indication of a user input. As such, the user interface 28 may include a display and, in some embodiments, may also include a keyboard, a mouse, a joystick, a touch screen, touch areas, soft keys, one or more microphones, a plurality of speakers, or other input/output mechanisms. In one embodiment, the processor 22 may comprise user interface circuitry configured to control at least some functions of one or more user interface elements such as a display and, in some embodiments, a plurality of speakers, a ringer, one or more microphones and/or the like. The processor 22 and/or user interface circuitry comprising the processor may be configured to control one or more functions of one or more user interface elements through computer program instructions (e.g., software and/or firmware) stored on a memory accessible to the processor (e.g., memory device 24, and/or the like).

Example Process for Communication with a Smart Device

Figure 3A:
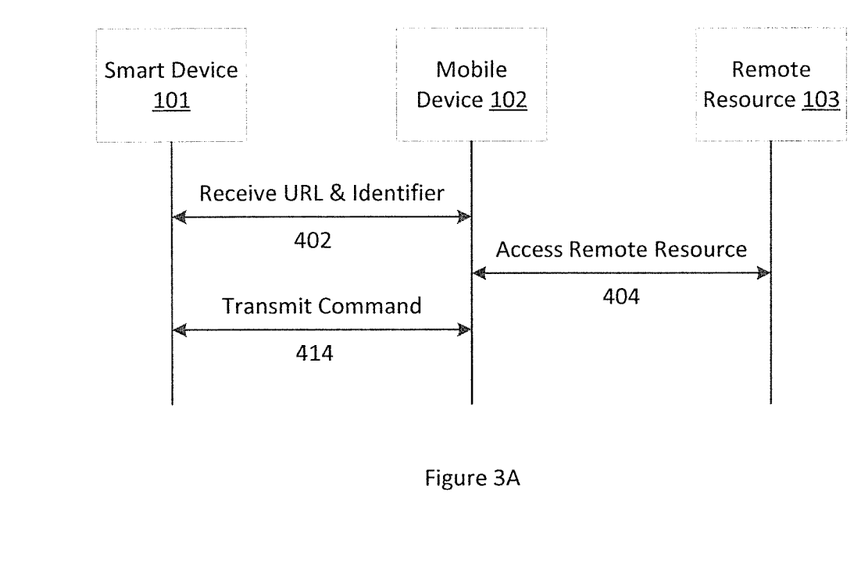
FIGS. 3A and 3B illustrate embodiments of message flow charts between a smart device, a mobile device, and a remote resource in accordance with an example embodiment of the present invention.
Figure 3B:
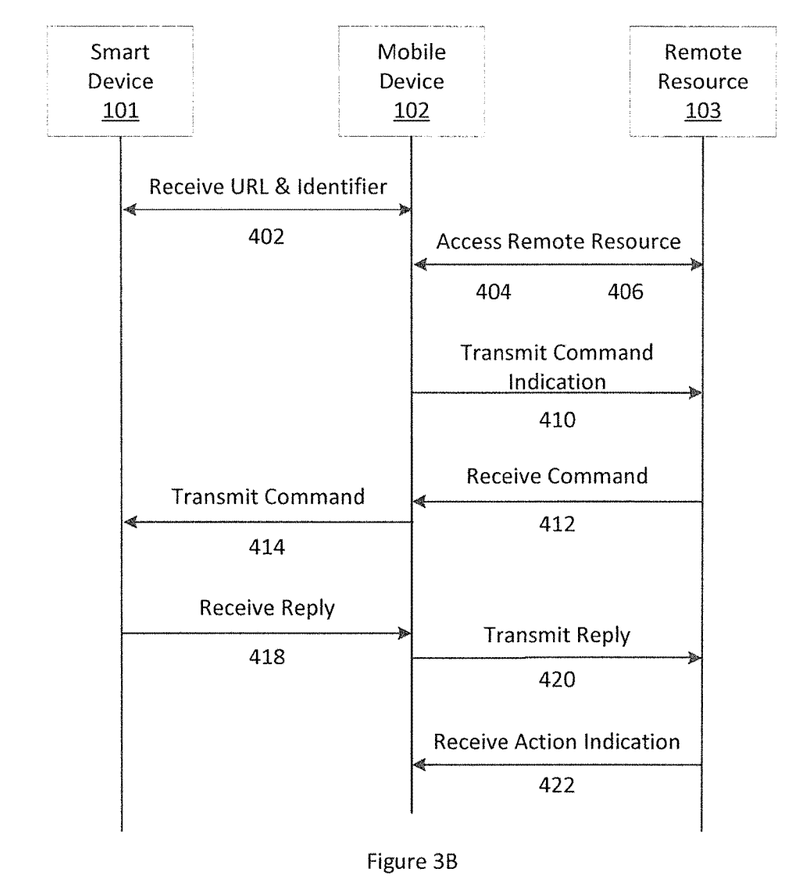

FIGS. 3A and 3B illustrate embodiments of message flowcharts between the smart device 101, mobile device 102, and the remote resource 103. The message flowcharts are provided to illustrate the messages traffic described in the operations of FIG. 4. The numbering of FIGS. 3A and 3B is consistent with the numbering of FIG. 4.

Figure 4:
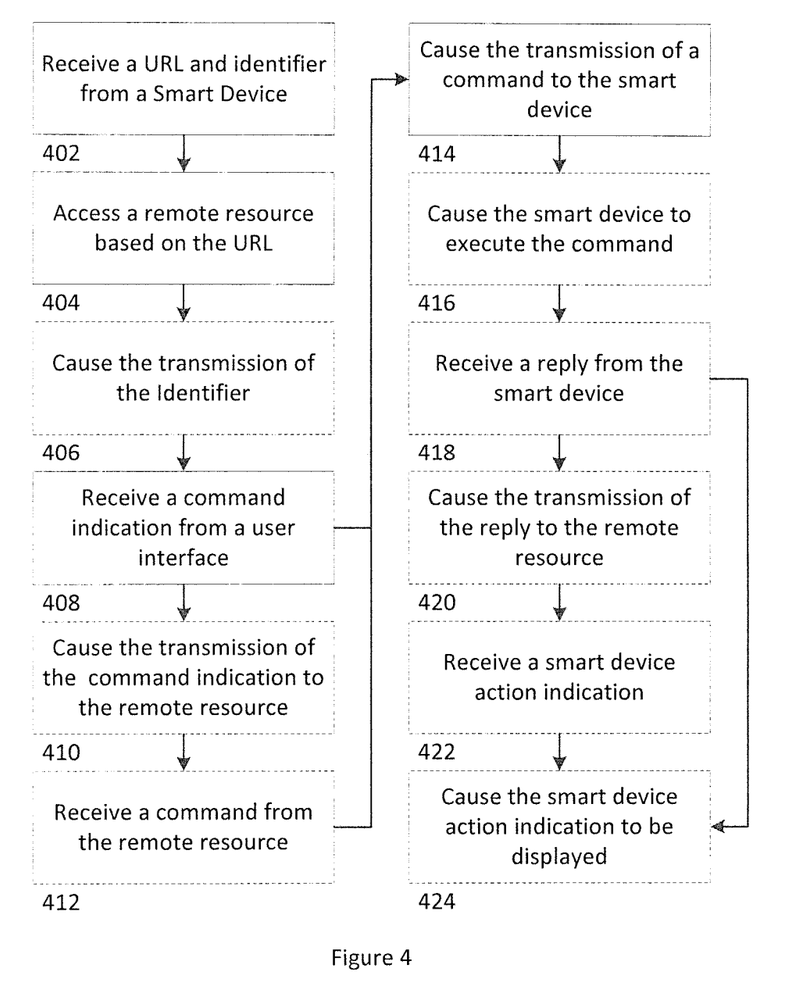
FIG. 4 is a flowchart illustrating the operations performed, such as by the apparatus of FIG. 2, in accordance with an example embodiment of the present invention.

Referring now to FIG. 4, the operations performed, such as by the apparatus 20 of FIG. 2, in order to directly control a smart device 101 with a remote resource 103 are illustrated. As shown in block 402 of FIG. 4, the apparatus may include means, such as the processor 22, the communication interface 26 or the like, configured to receive a network address, such as a URL, and a smart device identifier from a smart device 101. In an example embodiment, the smart device identifier may be an internet protocol (IP) or specific radio technology address, such as a Bluetooth address, a software object, or the like. The smart device identifier may be transmitted separately from the network address or as a portion of the URL, such as the query element. The processor 22 may receive the network address and smart device identifier from a communication interface 26. The communications interface 26 may receive the network address and smart device identifier from the smart device using a short range local connection 110, such as NFC, BLE, RFID, or the like. In an example embodiment, the communications interface 26 may receive the network address and the smart device identifier from a QR code, by scanning, capturing an image, or otherwise receiving the QR code data.

As shown in block 404 of FIG. 4, the apparatus 20 may include means, such as a processor 22, a communications interface 26 or the like, configured to access a remote resource 103. The processor 22 may be configured to automatically cause the browser to access the URL when received. In an example embodiment the processor 22 may notify the user of the received network address, and require a manual initiation to access the network address. For example, processor 22 may cause the network address to be displayed as a link or content sharing prompt on a user interface 28, which user may select to initiate the browser and access the network address, or reject. An example, content sharing prompt generated by a mobile device 102 receiving a network address from the smart device 101 is depicted in FIG. 5.

In an example embodiment the remote resource 103 may be an external internet page, an internet application, or the like that may be executed by the processor 22 or rendered on the user interface 28 of the apparatus 20. The processor 22 may be configured to cause the communication interface 26 to access the remote resource using a network connection 120, such as an internet connection. The processor 22 may be configured to display the accessed remote resource information in a browser on a user interface 28.

In some example embodiments, the accessed remote resource 103 may include or be associated with a smart device communications identifier. The smart device communication identifier may be an object identifier in a JavaScript runtime environment, or a specific application program interface (API) to fetch a software object that points to the smart device 101 that triggered the remote resource access. The smart device communication identifier may be added to the network address, such as the query element, or the like.

As shown in block 406 of FIG. 4, the apparatus 20 may include means such as a processor 22, the communications interface 26 or the like, configured to cause the transmission of the smart device identifier. The processor 22 may cause the communications interface 26 to transmit the smart device identifier to the remote resource 103 using the network connection 120. The smart device identifier may be transmitted to the remote resource 103, in an instance in which the network address does not contain the smart device identifier.

As shown in block 408 of FIG. 4, the apparatus 20 may include a means, such as a processor 22, the communications interface 26 or the like, configured to receive a command indication from the user interface 28. A user may select a command using the user interface 28 display of the remote resource 103. Examples if the functions for which commands may be provided include increase temperature, change advertisement display, display forecast, display outside temperature, start brewing coffee, or the like. The selected command indication is received by the processor 22. The process may continue at 410 in an instance in which the remote resource 103 certifies the command. Alternatively, the process may continue at 414, in an instance in which the apparatus 20 may transmit the command without certification by the remote resource 103. Example commands may include a new temperature setting, a forecast or outside temperature for display on the smart device, a new display or advertisement for display on the smart device user interface, brew coffee at a specified time, or the like.

As shown in block 410 of FIG. 4, the apparatus 20 may include means, such as a processor 22, the communication interface 26 or the like, configured to cause the transmission of the command indication to the remote resource 103. The processor 22 may cause the communication interface 26 to transmit the command indication to the remote resource. The communications interface 26 may transmit the command indication using the network connection 120. The remote resource 103 may certify the command indication and generate a command. In some embodiments, the transmission of the command indication from the apparatus 20 may be encrypted.

As shown in block 412 of FIG. 4, the apparatus 20 may include means, such as a processor 22, the communications interface 26 or the like, configured to receive a command from the remote resource 103. The processor 22 may receive the command from the communications interface 26, which may in turn receive the command from the remote resource using the internet connection 120. In some embodiments, the command transmitted by the remote resource 103 may be encrypted.

As shown at block 414 of FIG. 4, the apparatus 20 may include means, such as the processor 22, the communications interface 26 or the like, configured to cause the transmission of a command to the smart device 101. The processor 22 may cause the communications interface 26 to transmit the command to the smart device 101 using the short range local connection 110. The command may include the smart device communications identifier. Communications between the apparatus 20 and the smart device 101 may be means supported by both the mobile device and smart device, such as HTTP, WebSockets, constrained application protocol (CoAP), radio technology specific communications like BLE, NFC, RFID, or the like.

As shown in block 416 of FIG. 4, the apparatus 20 may include means, such as the processor 22 or the like, configured to cause the smart device to execute the command by transmitting the command to the smart device 101 that is executable by the smart device as described in block 414. The smart device 101 may receive the command transmitted by the apparatus 20. The smart device 101 may execute the action or actions of the command. The command may include, for example, a command to change display, change temperature setting, start brewing coffee, set a brew time for coffee, or the like.

As shown if block 418 of FIG. 4, the apparatus 20 may include means, such as the processor 22, the communication interface 26 or the like, configured to receive a reply from the smart device 101. The processor 22 may receive the reply from a communication interface 26, which, in turn, may receive the reply form the smart device 101 using the short range connection 110. The smart device 101 may transmit the reply in response to executing the command. The reply may include a smart device action indication, smart device identifier, or the like. The process may continue at 424, in an instance in which the apparatus, such as the processor 22, the user interface 28, or the like, causes display of the smart device action indication. Alternatively, the process may continue at 420, in an instance in which the remote resource 103 verifies the reply.

As shown in block 420 of FIG. 4, the apparatus 20 may include means such as a processor 22, the communication interface 26 or the like, configured to cause the transmission of the reply to the remote resource 103. The processor 22 may cause the communication interface 26 to transmit the reply to the remote resource 103 using the internet connection 120. In some embodiments, the transmission of the reply from the apparatus 20 may be encrypted. The remote resource 103 may receive the reply and verify the validity of the reply, such as the validity of the smart device identifier and/or the action indicated in the reply, or the like. In an instance in which the remote resource 103 verifies the reply, the remote resource may generate a smart device action indication.

As shown in block 422 of FIG. 4, the apparatus 20 may include means such as a processor 22, the communication interface 26 or the like, configured to receive a smart device action indication. The processor 22 may receive the smart device action indication as a portion of the reply as discussed at block 418. Alternatively or additionally, the processor 22 may receive the smart device action indication from the communication interface 26. The communications interface 26 may receive the smart device action indication from the remote resource 103 using the network connection 120.

As shown in block 424 of FIG. 4, the apparatus 20 may include means such as a processor 22 or the like, configured to cause the display of the smart device indication on a user interface 28. The processor 22 may cause the smart device indication to be displayed on the user interface in a window presented by a browser or other display.

As described above, FIG. 4 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 406, 410, 412, and 416-420 in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a network address and an identifier from a smart device;
accessing a remote resource based on the network address;
receiving a command indication, wherein the command indication indicates an action to be executed by the smart device;
causing transmission of the command indication to the remote resource;
receiving a command from the remote resource, wherein at least one of the transmission of the command indication or reception of the command are encrypted;
causing a transmission of the command to the smart device, wherein the transmission includes the smart device identifier, and
receiving a command reply from the smart device, wherein the command reply comprises an acknowledgement of the command, a status of execution of the command, a validity of the smart device identifier, and an indication of a smart device action.

2. The method of claim 1 further comprising,
causing the transmission of the identifier; and
wherein the accessing a remote resource is further based on the smart device identifier.

3. The method of claim 1 further comprising:
causing the smart device to execute the command.

4. The method of claim 1 further comprising:
causing the transmission of the command reply to the remote resource;
receiving an smart device action indication; and
causing the smart device action indication to be displayed on a user interface.

5. An apparatus comprising at least one processor and at least one memory including computer program code, the at least one memory and computer program code configured to, with the processor, cause the apparatus at least to:
receive a network address and an identifier from a smart device;
access a remote resource based on the network address;
receive a command indication, wherein the command indication indicates an action to be executed by the smart device;
cause transmission of the command indication to the remote resource;
receive a command from the remote resource, wherein at least one of the transmission of the command indication or reception of the command are encrypted;
cause a transmission of the command to the smart device, wherein the transmission includes the smart device identifier, and
receive a command reply from the smart device, wherein the command reply comprises an acknowledgement of the command, a status of execution of the command, a validity of the smart device identifier, and an indication of a smart device action.

6. The apparatus of claim 5, wherein the at least one memory and the computer program code are configured to, with the processor, cause the apparatus to:
cause the transmission of the identifier; and
wherein the accessing a remote resource is further based on the smart device identifier.

7. The apparatus of claim 5, wherein the at least one memory and the computer program code are configured to, with the processor, cause the apparatus to:
cause the smart device to execute the command.

8. The apparatus of claim 5, wherein the at least one memory and the computer program code are configured to, with the processor, cause the apparatus to:
cause the transmission of the command reply to the remote resource;
receive an smart device action indication; and
cause the smart device action indication to be displayed on a user interface.

9. A computer program product comprising a non-transitory computer readable medium having program code portions stored thereon, the program code portions configured, upon execution to:
receive a network address and an identifier from a smart device;
access a remote resource based on the network address;
receive a command indication, wherein the command indication indicates an action to be executed by the smart device;
cause transmission of the command indication to the remote resource;
receive a command from the remote resource, wherein at least one of the transmission of the command indication or reception of the command are encrypted;
cause a transmission of the command to the smart device, wherein the transmission includes the smart device identifier, and
receive a command reply from the smart device, wherein the command reply comprises an acknowledgement of the command, a status of execution of the command, a validity of the smart device identifier, and an indication of a smart device action.

10. The computer program product according to claim 9 wherein the program code portions are further configured, upon execution:
cause the transmission of the identifier; and
wherein the accessing a remote resource is further based on the smart device identifier.

11. The computer program product according to claim 9 wherein the program code portions are further configured, upon execution:
cause the smart device to execute the command.

12. The computer program product according to claim 9 wherein the program code portions are further configured, upon execution:
   cause the transmission of the command reply to the remote resource;
   receive an smart device action indication; and
      cause the smart device action indication to be displayed on a user interface.

\* \* \* \* \*